US006719255B2

(12) United States Patent
Chen

(10) Patent No.: US 6,719,255 B2
(45) Date of Patent: Apr. 13, 2004

(54) SUSPENDING DEVICE

(76) Inventor: Ting-Pang Chen, 2 Fl., No. 12, Lane 31, Shui-Yuan Rd., Taipei (TW)

(*) Notice: Subject to any disclaimer, the term of this patent is extended or adjusted under 35 U.S.C. 154(b) by 54 days.

(21) Appl. No.: 10/097,939

(22) Filed: Mar. 15, 2002

(65) Prior Publication Data

US 2003/0173485 A1 Sep. 18, 2003

(51) Int. Cl.$^7$ .............................. A47H 1/10; F16L 3/00

(52) U.S. Cl. ........................ 248/323; 248/327; 248/214; 248/230.5; 248/59; 248/70

(58) Field of Search ................................ 248/317, 340, 248/327, 323, 214, 230.5, 228.5, 316.6, 489, 131, 186.2, 58, 59, 62, 63, 72, 65, 67.7, 70, 74.4

(56) References Cited

U.S. PATENT DOCUMENTS

| | | | | | |
|---|---|---|---|---|---|
| 615,928 | A | * | 12/1898 | Wagner | 248/186.2 |
| 1,777,884 | A | * | 10/1930 | Horix | 248/230.5 |
| 2,980,378 | A | * | 4/1961 | Bethea | 248/63 |
| 3,023,990 | A | * | 3/1962 | Gunthel, Jr. | 248/70 |
| 4,071,217 | A | * | 1/1978 | Kongelka | 248/309.1 |
| 4,320,882 | A | * | 3/1982 | Bachle | 248/70 |
| 4,475,607 | A | * | 10/1984 | Haney | 188/67 |
| 5,184,911 | A | * | 2/1993 | Wu | 403/385 |
| 5,400,958 | A | * | 3/1995 | Walker | 232/39 |
| 5,622,343 | A | * | 4/1997 | Morton | 248/131 |
| 5,732,744 | A | * | 3/1998 | Barr et al. | 138/106 |
| 6,286,797 | B1 | * | 9/2001 | Thaxton | 248/229.14 |
| 6,527,240 | B1 | * | 3/2003 | Huang | 248/311.2 |

* cited by examiner

*Primary Examiner*—Korie Chan
*Assistant Examiner*—Naschica S. Morrison
(74) *Attorney, Agent, or Firm*—Troxell Law Office PLLC

(57) ABSTRACT

A suspending device for suspending an item such as a speaker onto a bar has a plate, a body and a retaining member. The plate is pivotally connected to an end of the body and the retaining member is connected to the other end of the body by screws. A first recessed end and a second recessed end are respectively formed on the body and the retaining member so as to firmly sandwich the bar between the first and second recessed ends. The item is connected to the plate so that the item can be securely suspended on the bar. Moreover, the item can be rotated with respect to the body so as to adjust its facing direction.

10 Claims, 5 Drawing Sheets

SUSPENDING DEVICE

BACKGROUND OF THE INVENTION

1. Field of the Invention

The present invention relates to a suspending device, and more particularly to a suspending device that can be used to conveniently and securely suspend an item on a bar.

2. Description of Related Art

In certain occasions, people have to suspend items onto bars. For example, to prepare for a concert, speakers are retained on bar members of trusses. However, these bar members usually have circular configurations which are not easy to securely suspend the items. Moreover, if the items are the speakers or other devices that vibrate during operation, it is even more difficult to maintain them in place. Normally, these vibrating devices will move or rotate undesirably, or in some extreme situations, will detach from the bar members and accidentally hit someone below.

Another common problem people meet is that once the speakers are securely hung on the trusses, directions which the speakers face are very important but can not be later adjusted freely for maximum performance.

Therefore, to overcome the shortcomings, the present invention intends to provide a suspending device to mitigate and obviate the aforementioned problems.

SUMMARY OF THE INVENTION

An objective of the present invention is to provide a suspending device that can be used to conveniently and securely suspend an item on a bar.

Another objective of the present invention is to provide a suspending device that can be used to suspend an item and the item after being suspended can be rotated as desired.

Other objectives, advantages and novel features of the invention will become more apparent from the following detailed description when taken in conjunction with the accompanying drawings.

To achieve the above objectives, the suspending device in accordance with the present invention has a plate, a body and a retaining member. The plate is pivotally connected to an end of the body and the retaining member is connected to the other end of the body by screws. A first recessed end and a second recessed end are respectively formed on the body and the retaining member so as to firmly sandwich the bar between the first and second recessed ends. The item is connected to the plate so that the item can be securely suspended on the bar. Moreover, the item can be rotated with respect to the body so as to adjust its facing direction.

DETAILED DESCRIPTION OF THE PREFERRED EMBODIMENT

Figure 1:
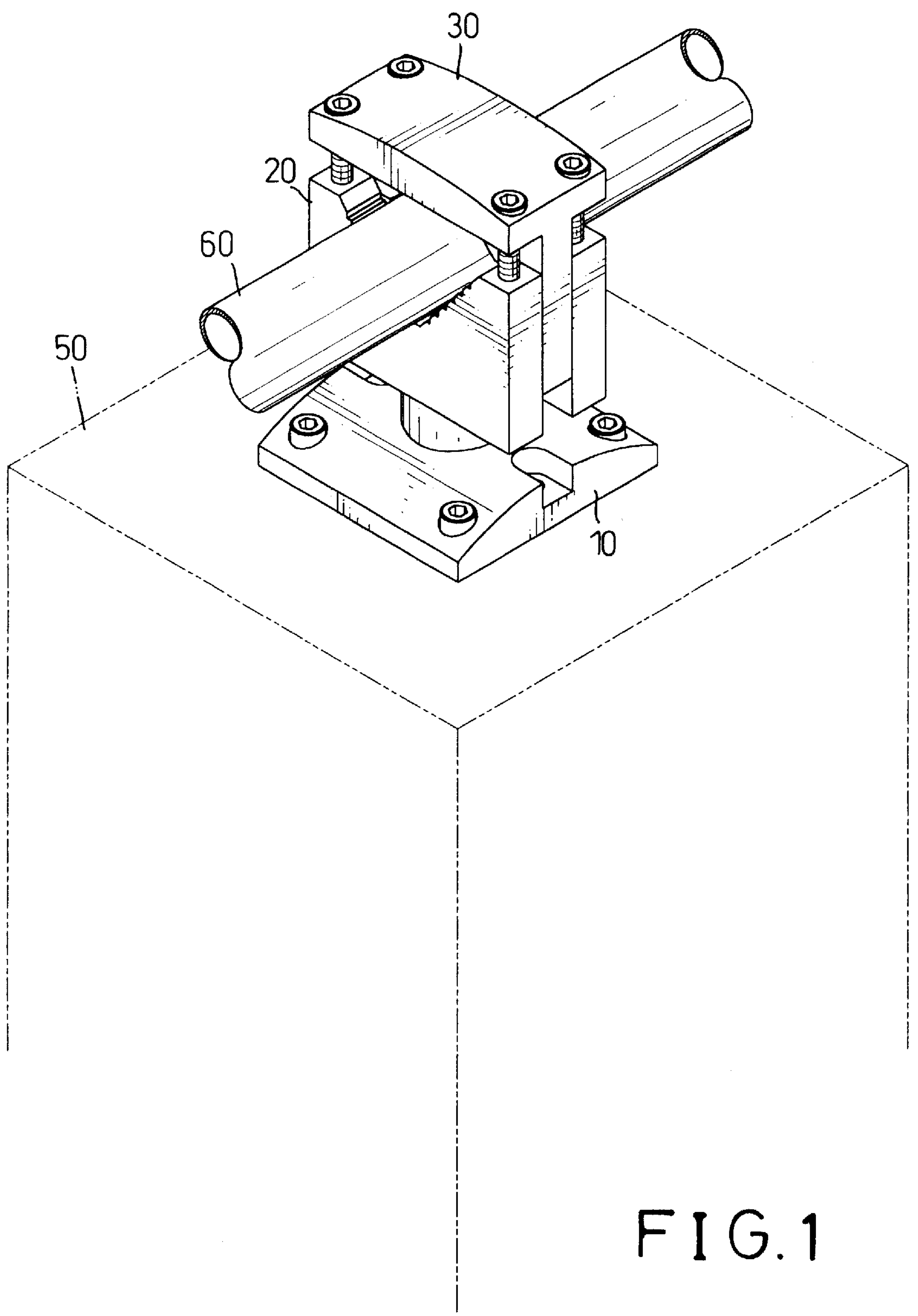
FIG. 1 is a perspective view of the suspending device showing how an item is suspended onto a bar using the suspending device.
Figure 2:
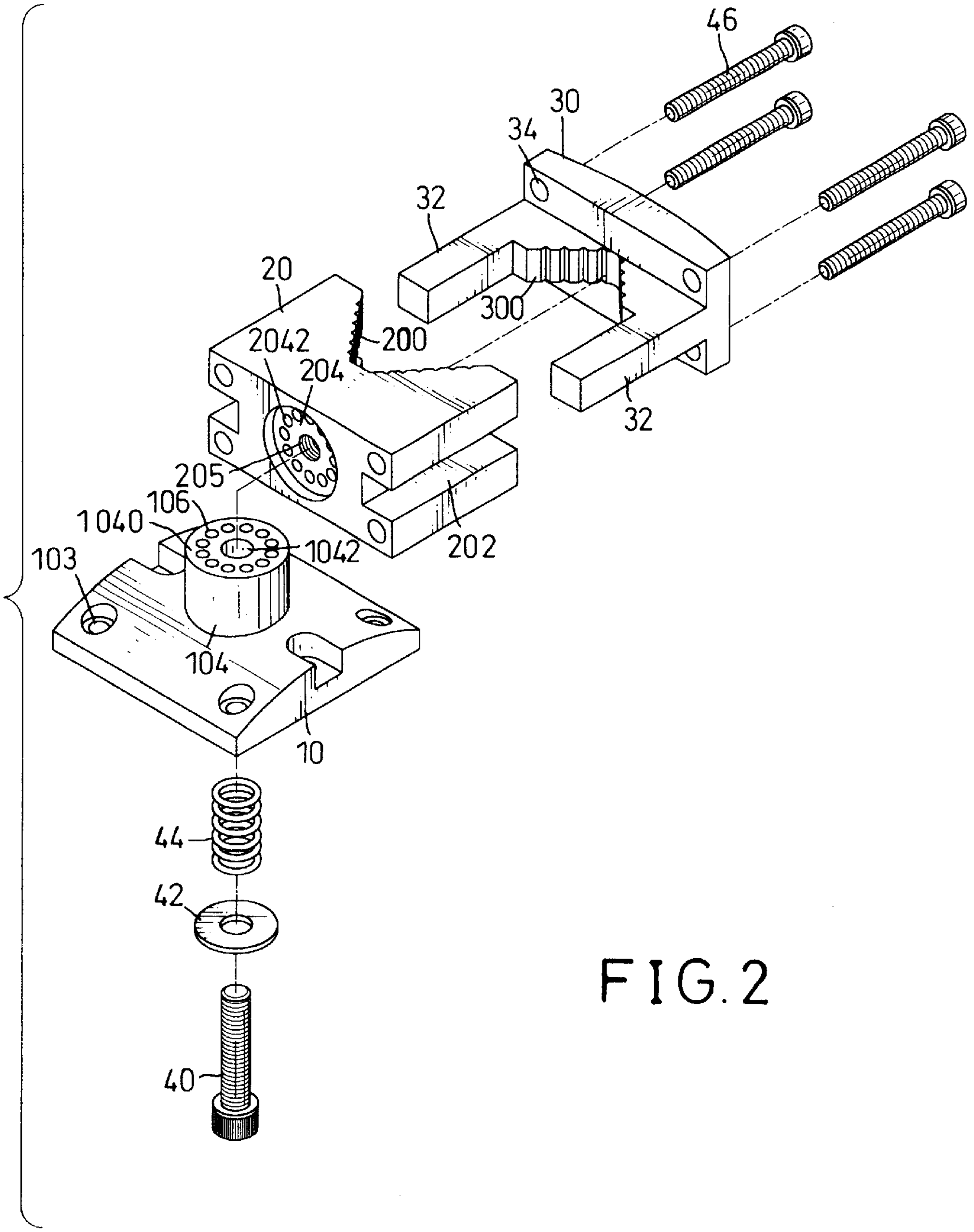
FIG. 2 is an exploded, perspective view of the suspending device in FIG. 1.

With reference to FIGS. 1 and 2, a suspending device in accordance with the present invention includes a plate (10), a body (20) and a retaining member (30).

Figure 3:
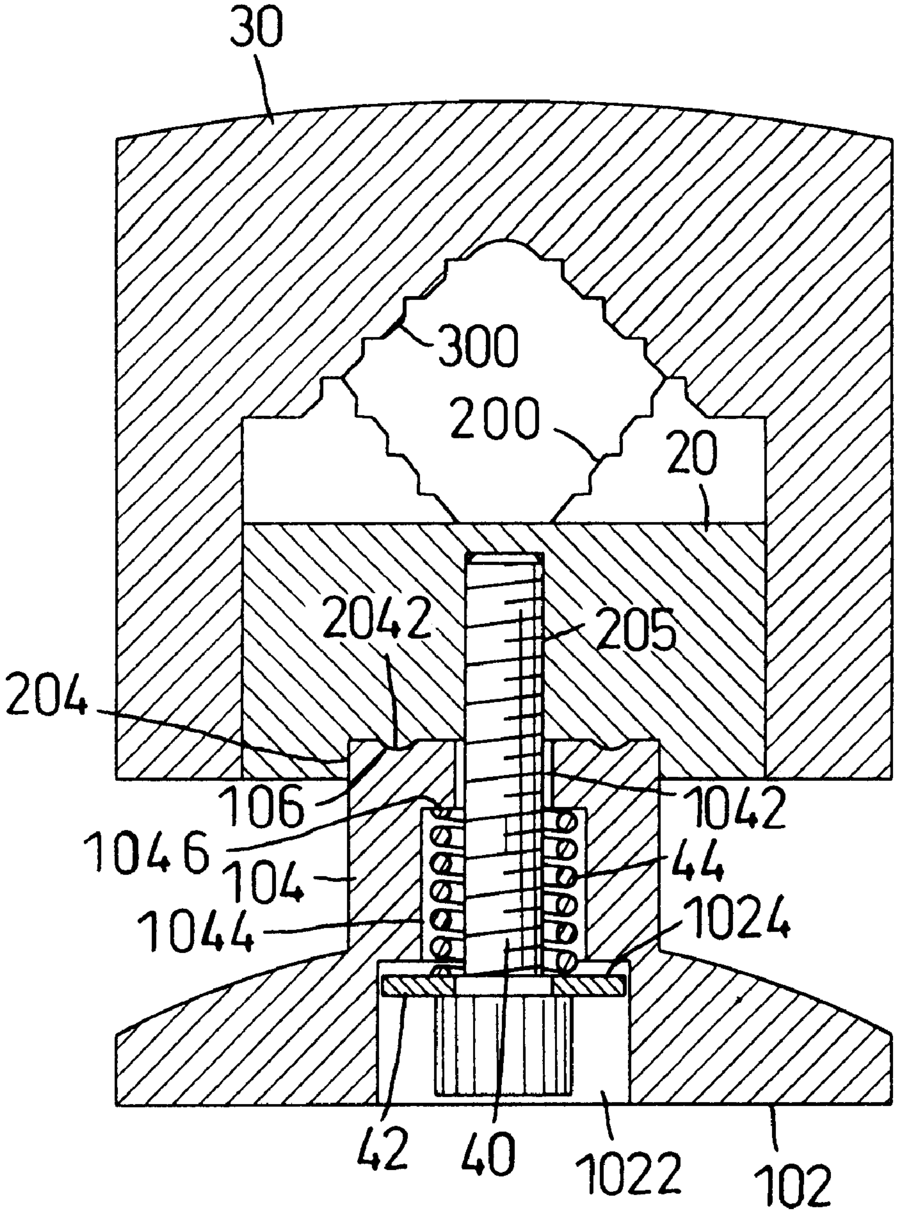
FIG. 3 is a cross-sectional view of the suspending device.
Figure 4:
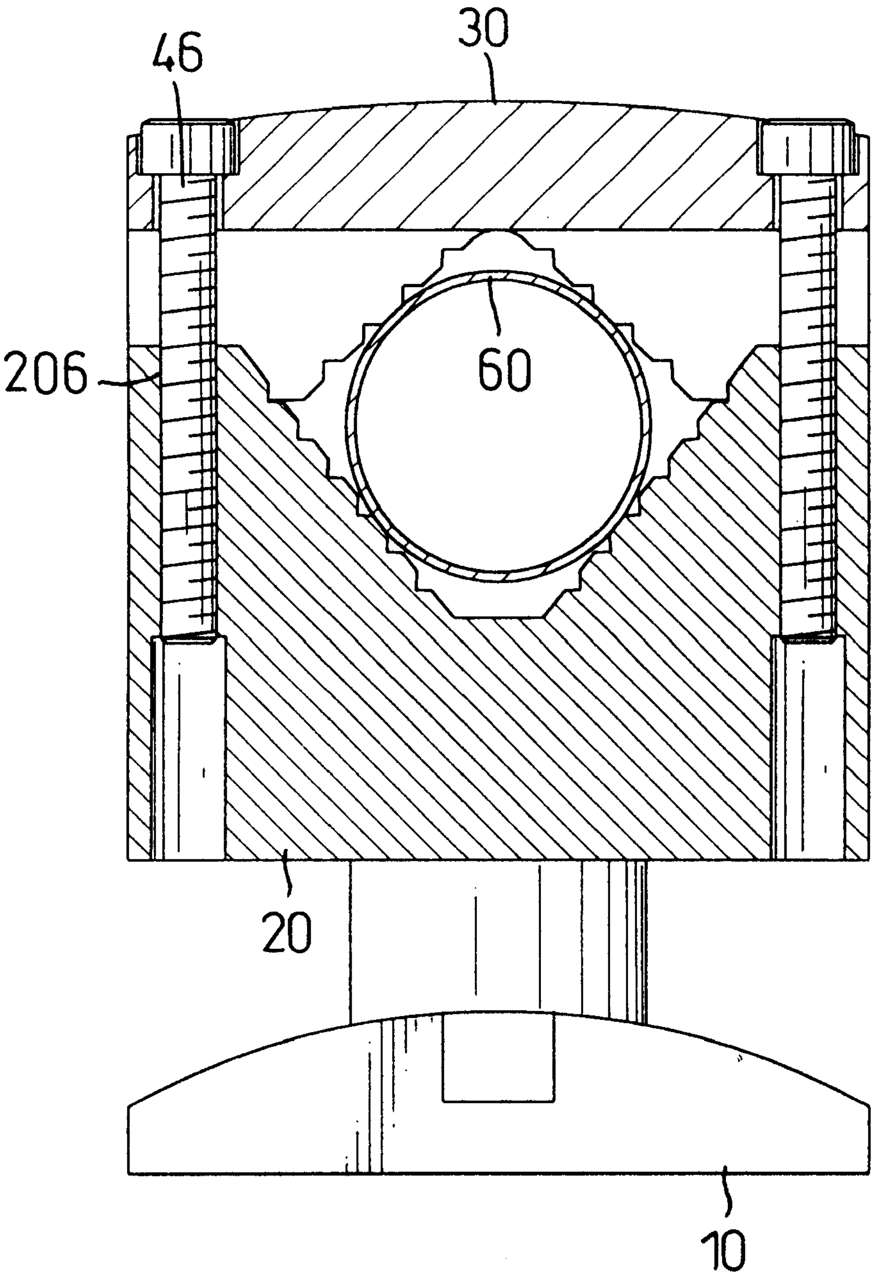
FIG. 4 is another cross-sectional view of the suspending device.

With reference to FIGS. 3 and 4, the plate (10) has a flat connecting surface (102) and a boss (104) formed on a surface opposite to the connecting surface (102). A pivotal surface (1040) is formed on a distal end of the boss (104). Multiple concavities (106) are defined in the pivotal surface (1040) and distributed in a circular formation. A through bore (1022) is defined in the connecting surface (102) and a through hole (1042) is defined in the pivotal surface (1040). A passage (1044) is defined in the boss (104) and communicates the through bore (1022) and the through hole (1042). Inner diameters of the through bore (1022), the passage (1044) and the through hole (1042) respectively vary from large to medium to small. In accordance with this variation in diameters, a first flange (1046) is formed at a transition region between the through hole (1042) and the passage (1044) and a second flange (1024) is formed at another transition region between the through bore (1022) and the passage (1044). Multiple securing holes (103) are defined through corners of the plate (10).

The body (20) has a substantially "I-shaped" cross-section and two siding slots (202) are respectively defined along lateral sides of the body (20). A socket (204) is centrally defined in an end face of the body (20) to mate to the boss (104). Multiple protrusions (2042) are formed on a bottom surface defining the socket (204) and the protrusions (2042) are distributed in a circular formation to mate the concavities (106). A threaded hole (205) is also defined in the bottom surface and among the protrusions (2042). A first recessed end (200) is formed on the body (20) and opposed to the end face having the socket (204) defined therein. Multiple threaded bores (206) are defined in corners of the first recessed end (200) as shown and numbered in FIG. 4.

The retaining member (30) has a second recessed end (300) formed thereon to mate the first recessed end (200) of the body (20). Two arms (32) integrally extend from the second recessed end (300) to respectively slide into the siding slots (202). Multiple connecting bores (34) are defined through corners of the retaining member (30).

With reference to FIGS. 3 and 4, in assembly of the suspending device, the plate (10) and the body (20) are placed in a position such that the pivotal surface (1040) engages the bottom surface defining the socket (204) so that the protrusions (2042) are respectively received in the concavities (106). A washer (42) and a spring (44) are disposed around a bolt (40). The bolt (40) then extends through the through hole (1042), the passage (1044) and the through bore (1022), and is further screwed into the threaded hole (205) to pivotally connect the plate (10) with the body (20). At this moment, the washer (42) is sandwiched between an end of the spring (44) and a head of the bolt (40), while the spring (44) is compressed between the washer (42) and the first flange (1046). Therefore, the spring (44) provides a resilience to urge the protrusions (2042) to be received in the concavities (106). Furthermore, the body (20) and the retaining member (30) are connected together by sliding the arms (32) into the corresponding sliding slot (202) and screwing multiple screws (46) through the connecting bores (34) and further into the threaded bores (206).

Again referring to FIG. 1, when using the suspending device to suspend an item (50) onto a bar (60), multiple screws (not numbered) are respectively extended through securing holes (103) defined in the plate (10) and further screwed into the item (50) to securely connect the plate (10) and the item (50). Then, the bar (60) extends through the space between the first and the second recessed ends (200 and 300), and by tightly screwing the screws (46), the bar is firmly sandwiched between surfaces of the first and the second recessed ends (200 and 300). Thereby, the item (50) is securely suspended on the bar (60).

Figure 5:
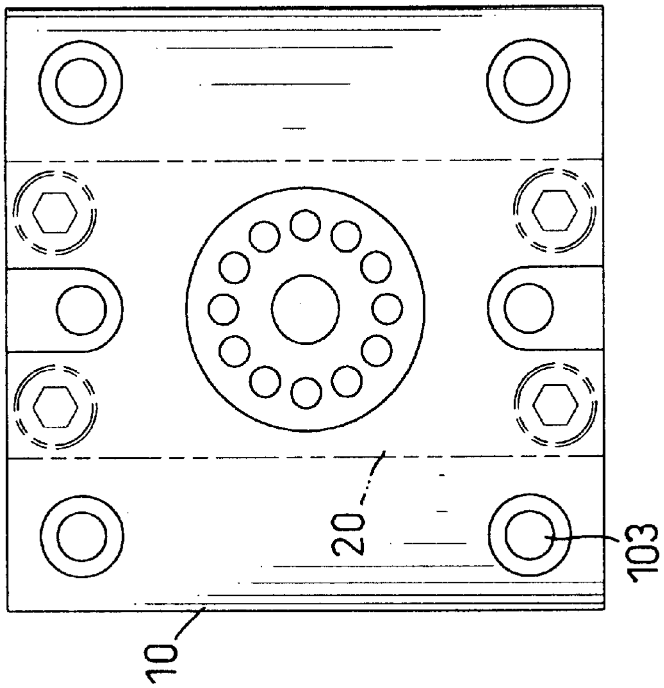
FIGS. 5 and 6 are plane-views showing the rotation between the body and the plate of the suspending device of the present invention.
Figure 6:
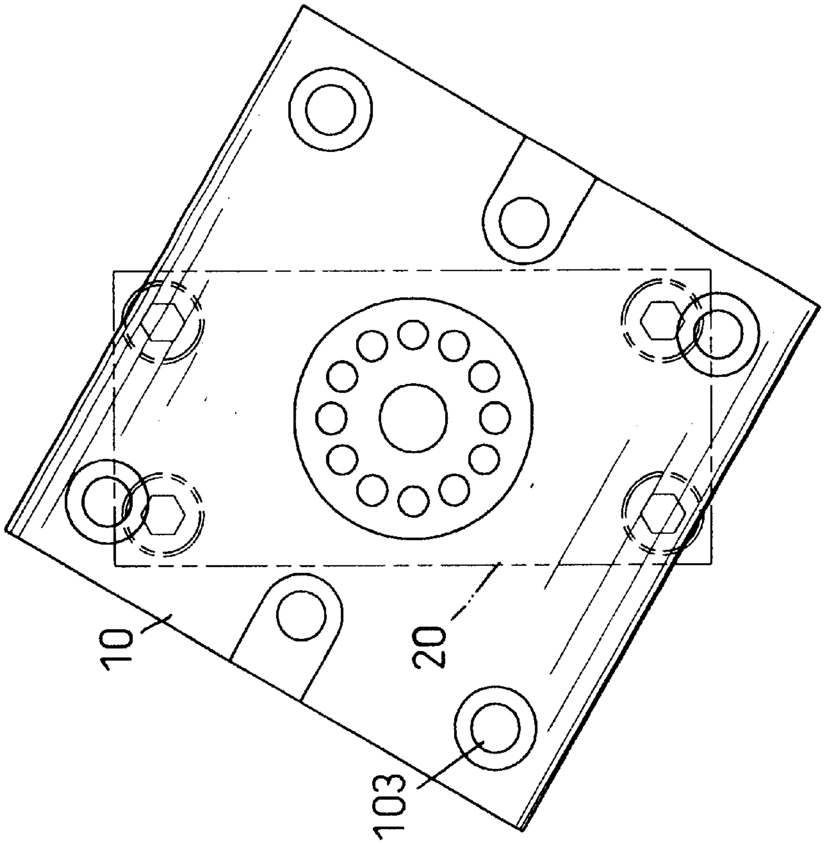

With reference to FIGS. 3, 5 and 6, when the direction which the item (50) faces requires adjustment, the item (50) can be directly rotated with respect to the body (20) by a proper force that temporarily disengages the protrusions (2042) and the concavities (106). After the item (50) is rotated to a desired direction, the protrusions (2042) again mate the concavities (106) to secure the relative position between the bar (60) and the item (50).

It is noted although the item (50) is of a speaker or any device that vibrates during its operation, the vibration can be absorbed by the spring (44). Therefore, after a period of suspending, the relative position between the bar (60) and the item (50) is secured and the item (50) is prevented from detaching the plate (10).

It is also noted that surfaces of the first and the second recessed ends (200 and 300) can be serrated as shown in FIGS. 1–4 to provide a firm grip against the bar (60).

Obviously, the positions of the protrusions (2042) and the concavities (106) can be inter-suspended, that is, forming the protrusions on the pivotal surface (1042) and correspondingly arranging the concavities in the bottom surface defining the socket (204) to still provide the same positioning effect.

While this invention has been particularly shown and described with references to the preferred embodiments thereof, it will be understood by those skilled in the art that various suspending devices in form and details may be made therein without departing from the scope of the invention encompassed by the appended claims.

What is claimed is:

1. A suspending device comprising:

a body having a first recessed end and multiple protrusions formed on an opposed end of the body with respect to the first recessed end;

a plate pivotally connected to the body and having a connecting surface for engaging with an item, multiple concavities defined in the plate to mate with the protrusions, a boss formed on the plate, wherein a pivotal surface is formed on a distal end of the boss and the concavities are defined in the pivotal surface, a socket is defined in the opposed end of the body and the protrusions are formed on a bottom surface defining the socket; and a retaining member connected with the body and having a second recessed end to make mate with the first recessed end, wherein a bolt hole is defined through the plate and a threaded hole is defined in the opposed end of the body, a bolt is extended through the bolt hole and further screwed into the threaded hole to pivotally connect the plate and the body, whereby a bar is able to be firmly sandwiched between the first recessed end and the second recessed end so that the item is securely suspended on the bar, and moreover, the plate can be rotated with respect to the body to adjust a direction which the item faces.

2. The suspending device as claimed in claim 1, further comprising a flange formed in the bolt hole, and a spring mounted around the bolt and compressed between the flange and a head of the bolt.

3. The suspending device as claimed in claim 2 further comprising a washer mounted around the bolt and sandwiched between the head and an end of the spring.

4. The suspending device as claimed in claim 1 further comprising multiple screws extended through the retaining member and screwed into the body to connect the retaining member with the body.

5. The suspending device as claimed in claim 1, wherein surfaces of the first recessed end and the second recessed end are serrated to provide a firm grip against the bar.

6. A suspending device comprising:

a body having a first recessed end and multiple concavities defined in an opposed end of the body with respect to the first recessed end;

a plate pivotally connected to the body and having a connecting surface for engaging with an item, multiple protrusions formed on the plate to mate with the concavities, a boss formed on the plate, wherein a pivotal surface is formed on a distal end of the boss and the protrusions are formed on the pivotal surface, a socket is defined in the opposed end of the body and the concavities are defined in a bottom surface defining the socket; and a retaining member connected with the body and having a second recessed end to mate with the first recessed end, wherein a bolt hole is defined through the plate and a threaded hole is defined in the opposed end of the body, a bolt is extended through the bolt hole and further screwed into the threaded hole to pivotally connect the plate and the body, whereby a bar is able to be firmly sandwiched between the first recessed end and the second recessed end so that the item is securely suspended on the bar, and moreover, the plate can be rotated with respect to the body to adjust a direction which the item faces.

7. The suspending device as claimed in claim 6, further comprising a flange formed in the bolt hole, and a spring mounted around the bolt and compressed between the flange and a head of the bolt.

8. The suspending device as claimed in claim 7 further comprising a washer mounted around the bolt and sandwiched between the head and an end of the spring.

9. The suspending device as claimed in claim 6 further comprising multiple screws extended through the retaining member and screwed into the body to connect the retaining member with the body.

10. The suspending device as claimed in claim 6, wherein surfaces of the first recessed end and the second recessed end are serrated to provide a firm grip against the bar.

* * * * *